(12) United States Patent
Amamoto et al.

(10) Patent No.: US 9,211,769 B2
(45) Date of Patent: Dec. 15, 2015

(54) RUBBER COMPOSITION AND TIRE USING THE SAME

(71) Applicant: BRIDGESTONE CORPORATION, Chuo-ku, Tokyo (JP)

(72) Inventors: Tetsuo Amamoto, Kodaira (JP); Koji Masaki, Higashimurayama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/360,693

(22) PCT Filed: Dec. 26, 2012

(86) PCT No.: PCT/JP2012/008342
§ 371 (c)(1),
(2) Date: May 27, 2014

(87) PCT Pub. No.: WO2013/099250
PCT Pub. Date: Jul. 4, 2013

(65) Prior Publication Data
US 2014/0326376 A1 Nov. 6, 2014

(30) Foreign Application Priority Data

Dec. 26, 2011 (JP) ................................. 2011-284033

(51) Int. Cl.
*B60C 11/14* (2006.01)
*C08L 7/00* (2006.01)
*B60C 1/00* (2006.01)
*C08L 21/00* (2006.01)
*C09D 123/08* (2006.01)

(52) U.S. Cl.
CPC . *B60C 11/14* (2013.01); *B60C 1/00* (2013.01); *B60C 1/0016* (2013.04); *C08L 7/00* (2013.01); *C08L 21/00* (2013.01); *C09D 123/0853* (2013.01); *B60C 2011/145* (2013.04)

(58) Field of Classification Search
CPC .............. B60C 11/14; B60C 1/00; C08L 7/00
See application file for complete search history.

(56) References Cited

FOREIGN PATENT DOCUMENTS

| EP | 1277874 A1 | 1/2003 |
|---|---|---|
| JP | 60-259503 A | 12/1985 |
| JP | 04-73232 A | 3/1992 |
| JP | 10-25367 A | 1/1998 |
| JP | 2003-519273 A | 6/2003 |
| JP | 2003-193332 A | 7/2003 |
| JP | 2009-091388 A | 4/2009 |
| JP | 2009-144032 * | 7/2009 |
| JP | 2009-144032 A | 7/2009 |

OTHER PUBLICATIONS

Communication dated Jul. 28, 2015 from the European Patent Office in counterpart application No. 12863466.4.
International Search Report of PCT/JP2012/008342 dated Feb. 5, 2013.
First Office Action issued Apr. 3, 2015 in corresponding Chinese Patent Application No. 201280064563.6 with translation.

* cited by examiner

*Primary Examiner* — Robert Harlan
(74) *Attorney, Agent, or Firm* — Sughrue Mion, PLLC

(57) ABSTRACT

The present invention relates to a rubber composition capable of sustaining improved on-ice performance of a tire over a long period of time. Specifically, the present invention provides a rubber composition having a rubber component (A) and a composite fiber (B), wherein the composite fiber (B) comprises: a fiber ($B_1$) made of a hydrophilic resin; a covering layer ($B_2$) made of a resin having an affinity for a rubber component and provided to cover at least a portion of the fiber; and a bonding layer ($B_3$) present at least in a portion of an interface between the fiber ($B_1$) and the covering layer ($B_2$) and having affinities for both the hydrophilic resin and the resin having an affinity for the rubber component.

12 Claims, 2 Drawing Sheets

RUBBER COMPOSITION AND TIRE USING THE SAME

CROSS REFERENCE TO RELATED APPLICATIONS

This is a National Stage of International Application No. PCT/JP2012/008342 filed Dec. 26, 2012, claiming priority based on Japanese Patent Application No. 2011-284033 filed Dec. 26, 2011, the contents of all of which are incorporated herein by reference in their entirety.

TECHNICAL FIELD

The present invention relates to a rubber composition and a tire using the rubber composition. In particular, the present invention relates to a rubber composition capable of exhibiting improved on-ice performance of a tire over a long period of time.

BACKGROUND ART

In a case of tires mainly for use in winter such as studless tires, on-ice performance thereof has been conventionally improved by using a rubber composition including a hydrophilic resin blended therein in tread portions of the tires. Use of a rubber composition including a hydrophilic resin blended therein in a tread portion of a tire satisfactorily ensures a good affinity of a tread surface for water on a road surface, thereby imparting the tire with good drainage properties to successfully improve on-ice performance thereof.

For example, PTL 1 discloses using a composition including a hydrophilic polymer blended therein in a tread portion of a tire and PTL 2 discloses using in a tread portion of a tire a composition including a water absorption agent obtained by introducing intermolecular crosslinks into water-soluble polymers.

CITATION LIST

Patent Literature

PTL 1: JP 2003-519273 Laid-Open
PTL 2: JP 60-259503 Laid-Open

SUMMARY OF THE INVENTION

Technical Problems

However, such a hydrophilic resin as described above, having a poor affinity for a hydrophobic rubber component, has a problem in terms of evenly dispersing it into the rubber component. Further, the hydrophilic resin easily comes off from the tread portion when it is exposed at a tread surface due to the poor affinity thereof for the hydrophobic rubber component, thereby causing another problem in terms of sustainability of a good effect of the hydrophilic resin.

In view of this situation, an object of the present invention is to solve the aforementioned problems of the prior art and provide a rubber composition capable of exhibiting improved on-ice performance of a tire over a long period of time. Further, another object of the present invention is to provide a tire using the rubber composition in a tread portion thereof and exhibiting good on-ice performance over a long period of time.

Solution to the Problems

As a result of a keen study to achieve the aforementioned objects, the inventors of the present invention discovered that it is possible to sustain improved on-ice performance of a tire over a long period of time by blending a rubber composition for use in a tread of the tire with a composite fiber (a short fiber) including: a fiber made of a hydrophilic resin; a covering layer made of a resin having an affinity for a rubber component and provided to cover at least a portion of the fiber; and a bonding layer present at least in a portion of an interface between the fiber and the covering layer and having affinities for both the hydrophilic resin and the resin having an affinity for the rubber component, thereby completing the present invention.

Specifically, a rubber composition of the present invention has a rubber component (A) and a composite fiber (B), wherein the composite fiber (B) includes: a fiber ($B_1$) made of a hydrophilic resin; a covering layer ($B_2$) made of a resin having an affinity for a rubber component and provided to cover at least a portion of the fiber; and a bonding layer ($B_3$) present at least in a portion of an interface between the fiber ($B_1$) and the covering layer ($B_2$) and having affinities for both the hydrophilic resin and the resin having an affinity for the rubber component.

A tire of the present invention is characterized in that it uses the rubber composition described above in a tread portion thereof.

Advantageous Effect of the Invention

According to the present invention, it is possible to provide a rubber composition, in particular, a rubber composition for use in a tread of a tire, having a composite fiber (a short fiber) blended therein and thus capable of sustaining improved on-ice performance of the tire over a long period of time, which composite fiber includes: a fiber made of a hydrophilic resin; a covering layer made of a resin having an affinity for a rubber component and provided to cover at least a portion of the fiber; and a bonding layer present at least in a portion of an interface between the fiber and the covering layer and having affinities for both the hydrophilic resin and the resin having an affinity for the rubber component. Further, according to the present invention, it is possible to provide a tire using the rubber composition in a tread portion thereof and thus exhibiting good on-ice performance over a long period of time.

DESCRIPTION OF THE EMBODIMENTS

Figure 1:
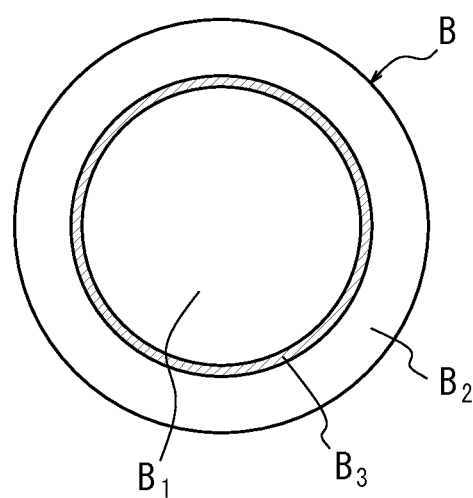
FIG. 1 is a cross sectional view of one example of a composite fiber (B) to be blended in a rubber composition of the present invention.
Figure 2:
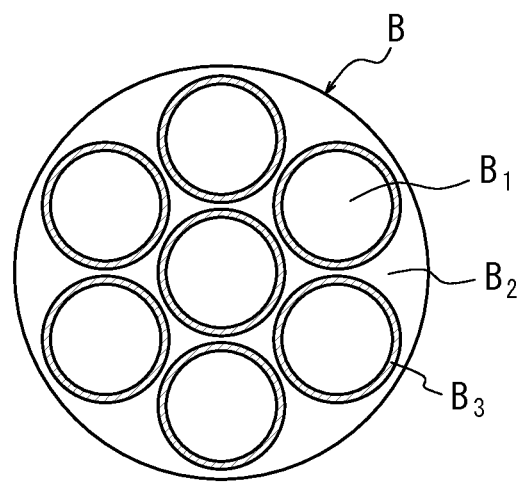
FIG. 2 is a cross sectional view of another example of a composite fiber (B) to be blended in the rubber composition of the present invention.

The present invention will be described in detail with reference to the drawings hereinafter. FIG. 1 is a cross sectional view of one example of a composite fiber (B) to be blended in a rubber composition of the present invention. The composite fiber (B) as exemplarily shown in FIG. 1 includes: a fiber ($B_1$) made of a hydrophilic resin; a covering layer ($B_2$) made of a resin having an affinity for a rubber component and provided to cover at least a portion of the fiber ($B_1$); and a bonding layer ($B_3$) present at least in a portion of an interface between the fiber ($B_1$) and the covering layer ($B_2$) and having affinities for both the hydrophilic resin and the resin having an affinity for the rubber component. Although the bonding resin ($B_3$) completely covers the fiber ($B_1$) made of a hydrophilic resin and the covering layer ($B_2$) made of a resin having an affinity for a rubber component completely covers the bonding layer ($B_3$) in the composite fiber (B) exemplarily shown in FIG. 1, the composite fiber (B) of the present invention is not limited thereto. That is, the bonding layer ($B_3$) may be formed either over the entire surface of the fiber ($B_1$) made of a hydrophilic resin or only on a portion of a surface of the fiber ($B_1$). Specifically, the bonding layer ($B_3$) is preferably formed so as to cover at least 50% of the entire surface area of the fiber ($B_1$). Further, the covering layer ($B_2$) made of a resin having an affinity for a rubber component may be formed either over the entire surface of the bonding layer ($B_3$) or only on a portion of a surface of the bonding layer ($B_3$). Specifically, the covering layer ($B_2$) is preferably formed so as to cover at least 50% of the entire surface area of the bonding layer ($B_3$). Examples of other configurations of the composite fiber (B) include a configuration as shown in FIG. 2, in which the fibers ($B_1$) made of a hydrophilic resin exist in a scattered manner at a number of positions, the bonding layers ($B_3$) cover the fibers ($B_1$) made of a hydrophilic resin, respectively, and the covering layer ($B_2$) made of a resin having an affinity for a rubber component (A) covers the bonding layers ($B_3$) in the composite fiber (B).

The rubber composition of the present invention is characterized in that the bonding layer ($B_3$) thereof has affinities for both the hydrophilic resin and the resin having an affinity for the rubber component. As a result, in this case, the covering layer ($B_2$) of the composite fiber (B) naturally exhibits high adhesion to and high affinity for the rubber component (A); and the fiber ($B_1$) portion made of a hydrophilic resin and the covering layer ($B_2$) of the composite fiber (B) are firmly adhered to each other by way of the bonding layers ($B_3$). Accordingly, in a case where the rubber composition of the present invention is used in a tread portion of a tire, the composite fiber (B) does not come off when the composite fiber (B) is exposed at a tread surface; and the fiber ($B_1$) portion made of a hydrophilic resin in the composite fiber (B) does not come off, either, when the fiber ($B_1$) portion made of a hydrophilic resin is exposed at the tread surface. It is therefore possible in a tire using the rubber composition of the present invention in a tread portion thereof to satisfactorily maintain an affinity of a tread surface for water on a road surface over a long period of time, impart the tire with good drainage properties, and improve on-ice performance of the tire over a long period of time.

If a rubber composition containing composite fibers were to be formed by directly covering the fiber ($B_1$) made of a hydrophilic resin with the covering layer ($B_2$) made of a resin having an affinity for a rubber component without providing the bonding layers ($B_3$) between the fiber ($B_1$) and the covering layer ($B_2$), for use in a tread portion of a tire, the fiber ($B_1$) portion made of a hydrophilic resin would come off at an early stage of wear of the tread portion due to insufficient adhesion between the fiber ($B_1$) made of a hydrophilic resin and the covering layer ($B_2$) made of a resin having an affinity for a rubber component. That is, in a case where such a rubber composition containing composite fibers formed without the bonding layers ($B_3$) provided therein as described above were to be used in the tread portion of the tire, an affinity of a tread surface for water on a road surface, i.e. drainage properties of the tire, would deteriorate at an early stage of wear of the tread portion, which results in deterioration of on-ice performance of the tire at an early stage of wear of the tread portion thereof.

As described above, the rubber composition of the present invention contains the composite fiber (B) including: a fiber ($B_1$) made of a hydrophilic resin; a covering layer ($B_2$) made of a resin having an affinity for a rubber component and provided to cover at least a portion of the fiber; and a bonding layer ($B_3$) present at least in a portion of an interface between the fiber ($B_1$) and the covering layer ($B_2$) and having affinities for both the hydrophilic resin and the resin having an affinity for the rubber component. Accordingly, in a case where the rubber composition is used in a tread portion of a tire, the fiber ($B_1$) portion made of a hydrophilic resin in the composite fiber (B) is reliably exposed at a tread surface during use of the tire so that an affinity of the tread surface for water can be satisfactorily ensured, thereby imparting the tire with good drainage properties and thus successfully improving on-ice performance of the tire. An affinity of fibers for water generally deteriorates dispersibility of the fibers in a rubber component. However, it is possible to significantly improve dispersibility of the composite fiber (B) in the rubber component (A) by covering a surface of the fiber ($B_1$) with the covering layer ($B_2$) via the bonding layers ($B_3$) therebetween in the present invention. Satisfactorily high wear resistance, as well as good drainage properties, of a tire can therefore be ensured in the present invention Type of the rubber component (A) of the rubber composition of the present invention is not particularly limited and examples thereof include natural rubber (NR) and synthetic rubber such as polyisoprene rubber (IR), styrene-botadiene copolymer rubber (SBR), polybutadiene rubber (BR), ethylene-propylene-diene rubber (EPDM), chloroprene rubber (CR), halogenated butyl rubber, acrylonitrile-butadiene rubber (NBR) and the like. Natural rubber (NR), styrene-botadiene copolymer rubber (SBR) and polybutadiene rubber (BR) are preferable among these examples. These examples of the rubber component may be used either solely or in combination of two or more types.

The composite fiber (B) for use in the rubber composition of the present invention contains the fiber ($B_1$) made of a hydrophilic resin therein. Type of the hydrophilic resin (a) for use in the fiber ($B_1$) is not particularly limited as long as the hydrophilic resin (a) is a resin capable of exhibiting an affinity for water, i.e. a resin having a hydrophilic group within a molecule thereof. Specifically, the hydrophilic resin (a) is preferably a resin having oxygen, nitrogen or sulfur atoms, more preferably a resin having at least one type of functional group selected from —OH, —COOH, —OCOR(R is alkyl group), —$NH_2$, —NCO and —SH, and further more preferably a resin having at least one type of functional group selected from —OH, —COOH, —$NH_2$ and —NCO.

More specifically, preferable examples of the hydrophilic resin (a) for use in the fiber ($B_1$) include ethylene-vinyl alcohol copolymer, vinyl alcohol homopolymer, poly(meth) acrylic acid or ester thereof, polyethylene glycol, carboxyvinyl copolymer, styrene-maleic acid copolymer, polyvinylpyrrolidone, vinylpyrrolidone-vinyl acetate copolymer, mercaptoethanol, and the like. Ethylene-vinyl alcohol copolymer, vinyl alcohol homopolymer, poly(meth) acrylic acid are more preferable and ethylene-vinyl alcohol copolymer is particularly preferable among these examples.

The hydrophilic resin (a) for use in the fiber ($B_1$) is preferably insoluble to water. In a case where fibers made of a hydrophilic resin insoluble to water is used for the fiber ($B_1$), the fiber ($B_1$) portion in the composite fiber (B) does not dissolve in water on a road surface when the fiber ($B_1$) portion is exposed at a tread surface, whereby it is possible to maintain hydrophilicity of the tread surface, i.e. improved drainage properties and on-ice performance of a tread, over a long period of time.

The average length of the fiber ($B_1$) made of a hydrophilic resin is generally in the range of 0.1 mm to 500 mm and preferably in the range of 0.1 mm to 7 mm. The average diameter of the fiber ($B_1$) is generally in the range of 0.001 mm to 2 mm and preferably in the range of 0.005 mm to 0.5 mm. An aspect ratio of the fiber ($B_1$) is generally in the range of 1 to 4,000 and preferably in the range of 5 to 1,000. An "aspect ratio" represents a ratio of the length of the long axis with respect to the length of the short axis of a fiber ($B_1$) in the present invention.

The composite fiber (B) for use in the rubber composition of the present invention contains the covering layer ($B_2$) made of a resin having an affinity for a rubber component. For example, a resin having a solubility parameter (SP value) close to that of the rubber component (A) can be used and, specifically, a polyolefin based resin is preferable as the resin (b) for use in the covering layer ($B_2$) having an affinity for the rubber component (A). The polyolefin based resin may be either branched or normal or an ionomer resin obtained by crosslinking molecules of ethylene-methacrylic acid copolymer by metal ions. Examples of the polyolefin based resin include polyethylene, polypropylene, polybutene, polystyrene, ethylene-propylene copolymer, ethylene-methacrylic acid copolymer, ethylene-ethyl acrylate copolymer, ethylene propylene diene terpolymer, ethylene-vinyl acetate copolymer, ionomer resins thereof, and the like. These examples of the resin (b) may be used either solely or in combination of two or more types. Polyethylene based resin, polypropylene based resin, polyolefin ionomer, and maleic anhydride-modified α-polyolefin are particularly preferable among the aforementioned examples. In a case where polyolefin ionomer or maleic anhydride-modified α-polyolefin is used for the resin (b), rubber strength can be further enhanced because these resins are bonded to hydroxyl groups, as well.

The composite fiber (B) for use in the rubber composition of the present invention contains the bonding layer ($B_3$) having affinities for both the hydrophilic resin (a) and the resin (b) having an affinity for the rubber component. A resin (c) having affinities for both the hydrophilic resin (a) and the resin (b) having an affinity for the rubber component or an adhesive can be used as the bonding layers ($B_3$). The resin (c) having affinities for both the hydrophilic resin (a) and the resin (b) having an affinity for the rubber component is preferably olefin based copolymer, more preferably olefin based copolymer having a polar group, and further more preferably ethylene-vinyl acetate copolymer (EVA), ethylene-maleic anhydride copolymer, ethylene-acrylic acid copolymer (EAA), ethylene-methyl acrylate copolymer (EMA), ethylene-ethyl acrylate copolymer (EEA), ethylene-methacrylate-glycidyl acrylate terpolymer; or various types of polyolefins each grafted with mono basic unsaturated aliphatic acid such as acrylic acid, methacrylic acid, dibasic unsaturated aliphatic acid such as maleic acid, fumalic acid, itaconic acid, or anhydrides thereof. Examples of the polyolefins each grafted with mono/di basic unsaturated aliphatic acid or anhydrides thereof include maleic acid-grafted EVA, maleic acid-grafted ethylene-α-olefin copolymer, and the like. The resin (c) is most preferably ethylene-methyl acrylate copolymer, ethylene-ethyl acrylate copolymer, ethylene-vinyl acetate copolymer, and ethylene-maleic anhydride copolymer. These examples of the resin (c) may be used either solely or in combination of two or more types.

Figure 3:
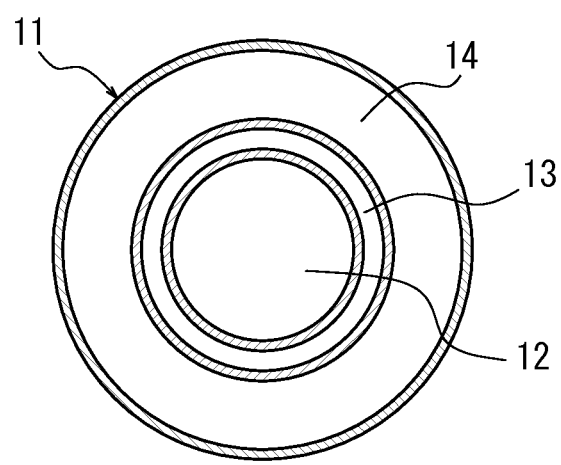
FIG. 3 is a cross sectional view of one example of a die.

The composite fiber (B) may be manufactured by (i) co-extrusion of the hydrophilic resin (a), the resin (b) having an affinity for the rubber component, and the resin (c) having affinities for both the hydrophilic resin and the resin having an affinity for the rubber component in a separate and mutually independent manner. For example, the composite fiber (B) can be manufactured by: preparing an extruder having a die 11 as shown in FIG. 3; simultaneously extruding the hydrophilic resin (a), the resin (c) having affinities for both the hydrophilic resin and the resin having an affinity for the rubber component, and the resin (b) having an affinity for the rubber component from a die exit 12, a die exit 13, and a die exit 14, respectively, thereby forming a non-drawn thread; and subjecting the non-drawn thread to hot drawing to process it to fibers. In this case, the composite fiber (B) in which the bonding resin ($B_3$) completely covers the fiber ($B_1$) made of a hydrophilic resin and the covering layer ($B_2$) made of a resin having an affinity for a rubber component completely covers the bonding layer ($B_3$), as shown in FIG. 1, can be obtained.

Figure 4:
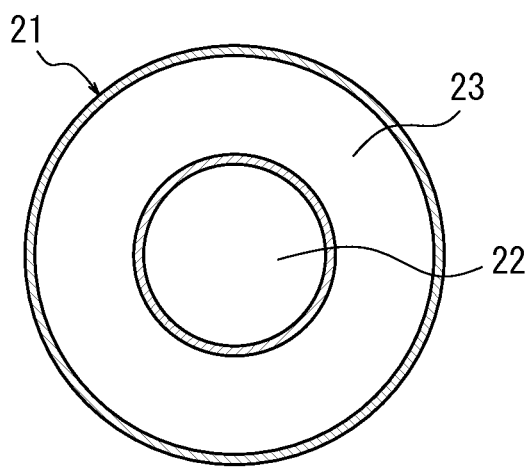
FIG. 4 is a cross sectional view of another example of the die.

Alternatively, the composite fiber (B) may be manufactured by (ii) co-extrusion of: a mixture of the hydrophilic resin (a) and the resin (c) having affinities for both the hydrophilic resin and the resin having an affinity for the rubber component; and the resin (b) having an affinity for the rubber component in a separate and mutually independent manner. For example, the composite fiber (B) can be manufactured by: preparing an extruder having a die 21 as shown in FIG. 4; simultaneously extruding a mixture of the hydrophilic resin (a) and the resin (c) having affinities for both the hydrophilic resin and the resin having an affinity for the rubber component from a die exit 22, and the resin (b) having an affinity for the rubber component from a die exit 23, respectively, thereby forming a non-drawn thread; and subjecting the non-drawn thread to hot drawing to process it to fibers. In this case, regarding a radially inner core portion formed by the mixture of the hydrophilic resin (a) and the resin (c) having affinities for both the hydrophilic resin and the resin having an affinity for the rubber component, of the composite fiber (B), the resin (c) is present in at least a part of an outer surface of the radially inner core portion so that this resin (c) portion of the outer surface of the radially inner core portion functions as the bonding layers ($B_3$) and contributes to adhesion of the fiber ($B_1$) and the covering layer ($B_2$).

Further, alternatively, the composite fiber (B) may be manufactured by (iii) co-extrusion of: the hydrophilic resin (a); and a mixture of the resin (b) having an affinity for the rubber component and the resin (c) having affinities for both the hydrophilic resin and the resin having an affinity for the rubber component in a separate and mutually independent manner. For example, the composite fiber (B) can be manufactured by: preparing an extruder having a die 21 as shown in FIG. 4; simultaneously extruding the hydrophilic resin (a) from a die exit 22, and a mixture of the resin (b) having an affinity for the rubber component and the resin (c) having affinities for both the hydrophilic resin and the resin having an affinity for the rubber component from a die exit 23, respectively, thereby forming a non-drawn thread; and subjecting the non-drawn thread to hot drawing to process it to fibers. In this case, regarding a radially outer portion formed by the mixture of the resin (b) having an affinity for the rubber component and the resin (c) having affinities for both the hydrophilic resin and the resin having an affinity for the rubber component, of the composite fiber (B), the resin (c) is present in at least a part of an inner surface of the radially outer portion so that this resin (c) portion of the inner surface of the radially outer portion functions as the bonding layers ($B_3$) and contributes to adhesion of the fiber ($B_1$) and the covering layer ($B_2$).

Proportions of the respective resins to be used in the composite fiber (B) may vary, depending on length and diameter of the targeted composite fiber (B). The proportion of the hydrophilic resin (a) in the composite fiber (B) is generally in the range of 1 to 90 mass % and preferably in the range of 10 to 90 mass %. The proportion of the resin (b) having an affinity for the rubber component in the composite fiber (B) is generally in the range of 0.01 to 50 mass % and preferably in the range of 0.1 to 10 mass %. The proportion of the resin (c) having affinities for both the hydrophilic resin and the resin having an affinity for the rubber component in the composite fiber (B) is generally in the range of 0.01 to 50 mass % and preferably in the range of 0.1 to 10 mass %. The bonding layers ($B_3$) can be reliably provided between the fiber ($B_1$) and the covering layer ($B_2$) so that adhesion between the fiber ($B_1$) and the covering layer ($B_2$) improves, by using the respective resins in the ranges described above.

The average length of the composite fiber (B) is generally in the range of 0.1 mm to 500 mm and preferably in the range of 0.1 mm to 7 mm. The average diameter of the composite fiber (B) is generally in the range of 0.001 mm to 2 mm and preferably in the range of 0.005 mm to 0.5 mm. Excessive tangling more than necessary between the composite fibers (B) themselves, which may deteriorate dispersibility of the composite fibers (B), can be prevented by setting the average length and the average diameter of the composite fiber (B) to be within the aforementioned ranges. An aspect ratio of the composite fiber (B) is generally in the range of 1 to 4,000 and preferably in the range of 5 to 1,000. An "aspect ratio" represents a ratio of the length of the long axis with respect to the length of the short axis of a composite fiber (B) in the present invention.

The content of the composite fiber (B) is generally in the range of 0.1 to 100 parts by mass and preferably in the range of 0.1 to 50 parts by mass with respect to 100 parts by mass of the rubber component (A). It is possible to impart a tire with good drainage properties and improve on-ice performance thereof by setting the content of the composite fiber (B) to be within the aforementioned range.

The rubber composition of the present invention may further contain a foaming agent. It is possible, by adding a foaming agent to the rubber composition, to disperse gas generated from the foaming agent during a vulcanization process in a scattered manner in rubber and/or make the gas permeate into the interior of the composite fiber (B) in a melted state so that an air bubble having a configuration corresponding to the configuration of the composite fiber (B) is formed therein. Such air bubbles present in the rubber can function as drainage grooves as a tire is worn, thereby successfully imparting the tire with further better drainage properties. Formation of air bubbles having configurations corresponding to the configurations of the composite fibers (B) is particularly advantageous because such air bubbles can function as drainage grooves more preferably and improve on-ice performance of the tire more significantly than otherwise.

Examples of the foaming agent include azodicarbonamide (ADCA), dinitrosopentamethylenetetramine (DPT), dinitrosopentastyrenetetramine, benzensulfonyl hydrazide derivatives, p,p'-oxybis(benzensulfonyl hydrazide) (OBSH), ammonium bicarbonate capable of generating $CO_2$, sodium bicarbonate, ammonium carbonate, nitroso sulfonyl azo compound capable of generating $N_2$, N,N'-dimethyl-N,N'-dinitroso-phthalamide, toluenesulfonyl hydrazide, p-toluenesulfonyl semicarbazide, p,p'-oxybis(benzensulfonyl semicarbazide), and the like. Azodicarbonamide (ADCA) and dinitrosopentamethylenetetramine (DPT) are preferable and azodicarbonamide (ADCA) is more preferable among these examples in terms of processability in production. These examples of the foaming agent may be used either solely or in combination of two or more types. The content of the foaming agent is not particularly restricted but preferably in the range of 0.1 to 10 parts by mass with respect to 100 parts by mass of the rubber component (A). The composite fiber (B) may be impregnated with the foaming agent.

It is preferable to use the foaming agent in combination with a foaming assistant agent such as urea, zinc stearate, zinc benzensulfinate, zinc white, and the like. These examples of the foaming assistant agent may be used either solely or in combination of two or more types. It is possible to facilitate a foaming reaction to enhance the degree of completion of the reaction by using the foaming assistant agent with the foaming agent, thereby successfully suppressing unwanted deterioration which would otherwise occur in the long term.

In addition to the rubber component (A), the composite fiber (B) and optionally the foaming agent and the foaming assistant agent described above, a compounding agent generally used in the rubber industry, such as filler like carbon black, softening agent, stearic acid, anti-oxidant, zinc white, vulcanization accelerator, vulcanizing agent, and the like, may be appropriately selected and blended with the rubber composition unless addition thereof to the rubber composition adversely affects the objects of the present invention.

The tire of the present invention, characteristically employing the rubber composition described above in a tread portion thereof, can demonstrate excellent on-ice performance for a long period of time. The tire of the present invention may be obtained by either molding a green tire using an unvulcanized rubber composition and then vulcanizing the green tire thus molded, or molding a green tire using half-vulcanized rubber subjected to preliminary vulcanization or the like and then completing the vulcanization, depending on the types of a tire and which member of the tire the rubber composition is to be applied. Examples of gas with which the tire is inflated include ambient air, air of which oxygen partial pressure has been adjusted, and inert gas such as nitrogen, argon, helium and the like.

EXAMPLES

The present invention will be described further in detail by Examples hereinafter. It should be noted that the present invention is not restricted by these Examples by any means.

<Manufacturing Method 1: Production of a Composite Fiber (B) Constituted of the Fiber ($B_1$), the Bonding Layer ($B_3$) and the Covering Layer ($B_2$)>

A composite fiber (B) constituted of the fiber ($B_1$) made of a hydrophilic resin (a), the bonding layers ($B_3$) made of a resin (c) having affinities for both the hydrophilic resin and the resin having an affinity for the rubber component, and the covering layer ($B_2$) made of a resin (b) having an affinity for a rubber component was manufactured by: preparing a twin screw extruder having a die 11 as shown in FIG. 3 and three hoppers; charging the hydrophilic resin (a), the resin (c) having affinities for both the hydrophilic resin and the resin having an affinity for the rubber component, and the resin (b) having an affinity for a rubber component into the corresponding hoppers, respectively; simultaneously extruding the hydrophilic resin (a), the resin (c) having affinities for both the hydrophilic resin and the resin having an affinity for the rubber component, and the resin (b) having an affinity for the rubber component from a die exit 12, a die exit 13, and a die exit 14, respectively; and cutting a thread thus obtained into fibers each having 3 mm length according to the conventional method. The diameter of each fiber was 50 μm.

<Manufacturing Method 2: Production of a Composite Fiber (B) Constituted of the Fiber ($B_1$), the Bonding Layer ($B_3$) and the Covering Layer ($B_2$)>

A composite fiber (B) constituted of the fiber ($B_1$) made of a hydrophilic resin (a), the bonding layers ($B_3$) made of a resin (c) having affinities for both the hydrophilic resin and the resin having an affinity for the rubber component, and the covering layer ($B_2$) made of a resin (b) having an affinity for a rubber component was manufactured by: preparing a twin screw extruder having a die 21 as shown in FIG. 4 and two hoppers; charging a mixture of the hydrophilic resin (a) and the resin (c) having affinities for both the hydrophilic resin and the resin having an affinity for the rubber component into one hopper and the resin (b) having an affinity for a rubber component into the other hopper; simultaneously extruding the mixture of the hydrophilic resin (a) and the resin (c) having affinities for both the hydrophilic resin and the resin having an affinity for the rubber component from a die exit 22 and the resin (b) having an affinity for the rubber component from a die exit 23; and cutting a thread thus obtained into fibers each having 3 mm length according to the conventional method. The diameter of each fiber was 50 μm.

<Manufacturing Method 3: Production of a Composite Fiber (B) Constituted of the Fiber ($B_1$), the Bonding Layer ($B_3$) and the Covering Layer ($B_2$)>

A composite fiber (B) constituted of the fiber ($B_1$) made of a hydrophilic resin (a), the bonding layers ($B_3$) made of a resin (c) having affinities for both the hydrophilic resin and the resin having an affinity for the rubber component, and the covering layer ($B_2$) made of a resin (b) having an affinity for a rubber component was manufactured by: preparing a twin screw extruder having a die 21 as shown in FIG. 4 and two hoppers; charging the hydrophilic resin (a) into one hopper and a mixture of the resin (b) having an affinity for a rubber component and the resin (c) having affinities for both the hydrophilic resin and the resin having an affinity for the rubber component into the other hopper; simultaneously extruding the hydrophilic resin (a) from a die exit 22 and the mixture of the resin (b) having an affinity for a rubber component and the resin (c) having affinities for both the hydrophilic resin and the resin having an affinity for the rubber component from a die exit 23; and cutting a thread thus obtained into fibers each having 3 mm length according to the conventional method. The diameter of each fiber was 50 μm.

<Manufacturing Method 4: Production of a Composite Fiber Constituted of the Fiber ($B_1$) and the Covering Layer ($B_2$)>

A composite fiber constituted of the fiber ($B_1$) made of a hydrophilic resin (a) and the covering layer ($B_2$) made of a resin (b) having an affinity for a rubber component was manufactured by: preparing a twin screw extruder having a die 21 as shown in FIG. 4 and two hoppers; charging the hydrophilic resin (a) into one hopper and the resin (b) having an affinity for a rubber component into the other hopper; simultaneously extruding the hydrophilic resin (a) from a die exit 22 and the resin (b) having an affinity for a rubber component from a die exit 23; and cutting a thread thus obtained into fibers each having 3 mm length according to the conventional method. The diameter of each fiber was 50 μm.

<Preparation of Rubber Compositions>

Rubber compositions were prepared according to a blending protocol shown in Table 1 below by using composite fibers manufactured by the aforementioned methods, wherein details of the composition and the proportions of the hydrophilic resin (a), the resin (c) having affinities for both the hydrophilic resin and the resin having an affinity for the rubber component, and the resin (b) having an affinity for a rubber component of each of the composite fibers were changed as shown in Tables 2 to 4.

TABLE 1

|  | Content (Parts by mass) |
| --- | --- |
| Natural rubber | 60 |
| Polybutadiene rubber *1 | 40 |
| Carbon black *2 | 60 |
| Stearic acid | 2 |
| Zinc white | 6 |
| Vulcanization accelerator *3 | 1.2 |
| Insoluble sulfur | 4 |
| Foaming agent *4 | 4 |
| Composite fiber | 7 |

*1 "BR01" (cis-1,4-polybutadiene), manufactured by JSR Corporation
*2 "Carbon N220", manufactured by Asahi Carbon Co., Ltd.
*3 "NOCCELER DM" (di-2-benzothiazyl disulfide), manufactured by Ouchi Shinko Chemical Industrial Co., Ltd.
*4 "CELMIKE AN" (diintrosopentamethylenetetramine, DPT), manufactured by Sankyo Kasei Co., Ltd.

<Adhesion Between Rubber and Composite Fiber>

A rubber composition was prepared by excluding the composite fiber and the foaming agent from the blending protocol shown in Table 1. On the other hand, the composite fibers or threads (×100) prior to cutting were bundled and twisted (30 twists/10 cm), whereby a fiber cord was produced. A sample was prepared by embedding the fiber cord in the rubber composition and vulcanizing the rubber composition having the fiber cord embedded therein. Tensile force (kgf/inch) required for pulling the fiber cord out of the sample was measured at the room temperature (25° C.) and the tensile force thus measured was regarded as adhesion between the rubber and the composite fiber. The values of adhesion between the rubber and the composite fiber thus measured were expressed as index values relative to the corresponding value "100" of Example 5.

<Preparation of Tire>

Test tires were prepared by: molding green tires by using in tread portions thereof the aforementioned rubber compositions prepared according to the blending protocol shown in Table 1, respectively; and vulcanizing the green tires by the conventional method, to obtain tires having size: 195/65R15. On-ice performances of the test tires thus obtained were evaluated by the following method. The results are shown in Tables 2 to 4.

(1) On-Ice Performance at Early Stage

On-ice performance at an early stage of each of the new test tires was analyzed by: mounting the tire on a vehicle; driving the vehicle on an icy flat road; and stepping on the brake at the speed of 20 km/hour to bring the tires into a locked state and measuring a braking distance traveled by the vehicle after stepping on the brake till the vehicle completely stopped. The braking distances thus measured of the test tires were converted to reciprocals and then expressed as index values relative to the corresponding reciprocal value "100" of Comparative Example 1. The larger index value represents the better braking performance on ice.

(2) On-Ice Performance after Running 50 km

On-ice performance after running 50 km of each of the new test tires was analyzed by: mounting the tire on a vehicle; driving the vehicle on a dry road surface 50 km and then on an icy flat road; and stepping on the brake at the speed of 20 km/hour to bring the tires into a locked state and measuring a braking distance traveled by the vehicle after stepping on the brake till the vehicle completely stopped. The braking distances thus measured of the test tires were converted to reciprocals and then expressed as index values relative to the corresponding reciprocal value "100" of the same tire at the early stage thereof. The larger index value represents the better braking performance on ice.

TABLE 2

| | | | | Example 1 | Example 2 | Example 3 | Example 4 | Example 5 | Example 6 | Example 7 | Example 8 |
|---|---|---|---|---|---|---|---|---|---|---|---|
| Composition of composite fiber | Hydrophilic resin fiber (B₁) | EVOH *5 | Mass % | 70 | 70 | 70 | 70 | 70 | 70 | 70 | 70 |
| | | Acrylic resin *6 | *14 | — | — | — | — | — | — | — | — |
| | Adhesion layer (B₃) | EMA *7 | | 2 | — | — | — | 2 | — | — | — |
| | | EEA *8 | | — | 2 | — | — | — | 2 | — | — |
| | | EVA *9 | | — | — | 2 | — | — | — | 2 | — |
| | | Maleic anhydride *10 | | — | — | — | 2 | — | — | — | 2 |
| | Covering layer (B₂) | PE *11 | | 28 | 28 | 28 | 28 | 28 | 28 | 28 | 28 |
| | | PP *12 | | — | — | — | — | — | — | — | — |
| | | 6-nylon *13 | | — | — | — | — | — | — | — | — |
| Manufacturing method of composite fiber | | | — | Method 3 | Method 3 | Method 3 | Method 3 | Method 2 | Method 2 | Method 2 | Method 2 |
| Adhesion between rubber and composite fiber | | | Index | 80 | 76 | 75 | 75 | 100 | 77 | 78 | 79 |
| On-ice performance at early stage | | | Index | 103 | 97 | 103 | 101 | 102 | 101 | 100 | 100 |
| On-ice performance after running 50 km | | | Index | 95 | 92 | 91 | 89 | 95 | 89 | 92 | 93 |

TABLE 3

| | | | | Example 9 | Example 10 | Example 11 | Example 12 | Example 13 | Example 14 | Example 15 | Example 16 | Example 17 | Example 18 |
|---|---|---|---|---|---|---|---|---|---|---|---|---|---|
| Composition of composite fiber | Hydrophilic resin fiber (B₁) | EVOH *5 | Mass % | 70 | 70 | — | — | — | 70 | 70 | 70 | 70 | 70 |
| | | Acrylic resin *6 | *14 | — | — | 70 | 70 | 70 | — | — | — | — | — |
| | Adhesion layer (B₃) | EMA *7 | | 2 | 2 | 2 | 2 | 2 | 2 | 0.5 | 1 | 5 | 10 |
| | | EEA *8 | | — | — | — | — | — | — | — | — | — | — |
| | | EVA *9 | | — | — | — | — | — | — | — | — | — | — |
| | | Maleic anhydride *10 | | — | — | — | — | — | — | — | — | — | — |
| | Covering layer (B₂) | PE *11 | | — | — | 28 | — | — | 28 | 29.5 | 29 | 25 | 20 |
| | | PP *12 | | 28 | — | — | 28 | — | — | — | — | — | — |
| | | 6-nylon *13 | | — | 28 | — | — | 28 | — | — | — | — | — |
| Manufacturing method of composite fiber | | | — | Method 3 | Method 3 | Method 3 | Method 3 | Method 3 | Method 1 | Method 3 | Method 3 | Method 3 | Method 3 |
| Adhesion between rubber and composite fiber | | | Index | 97 | Index | 110 | 111 | 112 | 150 | 70 | 85 | 104 | 110 |
| On-ice performance at early stage | | | Index | 101 | Index | 102 | 102 | 103 | 103 | 102 | 101 | 102 | 101 |
| On-ice performance after running 50 km | | | Index | 95 | Index | 96 | 97 | 96 | 96 | 76 | 92 | 95 | 96 |

TABLE 4

| | | | | Comp. Example 1 | Comp. Example 2 | Comp. Example 3 | Comp. Example 4 | Comp. Example 5 | Comp. Example 6 |
|---|---|---|---|---|---|---|---|---|---|
| Composition of composite fiber | Hydrophilic resin fiber (B₁) | EVOH *5 | Mass % | 70 | — | 70 | — | 70 | — |
| | | Acrylic resin *6 | *14 | — | 70 | — | 70 | — | 70 |
| | Adhesion layer (B₃) | EMA *7 | | — | — | — | — | — | — |
| | | EEA *8 | | — | — | — | — | — | — |
| | | EVA *9 | | — | — | — | — | — | — |
| | | Maleic anhydride *10 | | — | — | — | — | — | — |
| | Covering layer (B₂) | PE *11 | | 30 | 30 | — | — | — | — |
| | | PP *12 | | — | — | 30 | 30 | — | — |
| | | 6-nylon *13 | | — | — | — | — | 30 | 30 |
| Manufacturing method of composite fiber | | | — | Method 4 | Method 4 | Method 4 | Method 4 | Method 4 | Method 4 |
| Adhesion between rubber and composite fiber | | | Index | 5 | 8 | 8 | 7 | 15 | 20 |
| On-ice performance at early stage | | | Index | 100 | 97 | 101 | 97 | 102 | 102 |
| On-ice performance after running 50 km | | | Index | 50 | 40 | 60 | 45 | 52 | 43 |

It is understood from the results of Examples 1 to 18 and Comparative Examples 1 to 6 in Tables 2 to 4 that on-ice performance of a tire can be significantly improved in terms of sustainability by employing in a tread portion thereof a rubber composition containing the composite fiber (B) formed by covering the fiber ($B_1$) made of a hydrophilic resin with the covering layer ($B_2$) by way of the bonding layers ($B_3$) therebetween.

Further, it is understood from the results of Examples 15 to 18 in Table 3 that it is preferable to set the proportion of the bonding layers ($B_3$) in the composite fiber (B) to be at least 1 mass %.

REFERENCE SIGNS LIST

B Composite fiber
$B_1$ Fiber made of hydrophilic resin
$B_2$ Covering layer made of resin having affinity for rubber component
$B_3$ Bonding layers having affinities for both hydrophilic resin and resin having affinity for rubber component
11, 21 Die
12, 13, 14, 22, 23 Die exit

The invention claimed is:

1. A rubber composition having a rubber component (A) and a composite fiber (B), wherein the composite fiber (B) comprises:
a fiber ($B_1$) made of a hydrophilic resin;
a covering layer ($B_2$) made of a resin having an affinity for a rubber component and provided to cover at least a portion of the fiber; and
a bonding layer ($B_3$) present at least in a portion of an interface between the fiber ($B_1$) and the covering layer ($B_2$) and having affinities for both the hydrophilic resin and the resin having an affinity for the rubber component.

2. The rubber composition of claim 1, wherein the bonding layer ($B_3$) is made of at least one type of resin selected from the group consisting of ethylene-methyl acrylate copolymer, ethylene-ethyl acrylate copolymer, ethylene-vinyl acetate copolymer, and ethylene-maleic anhydride copolymer.

3. The rubber composition of claim 1, wherein the hydrophilic resin includes oxygen, nitrogen or sulfur atoms.

4. The rubber composition of claim 3, wherein the hydrophilic resin includes at least one type of functional group selected from the group consisting of —OH, —COOH, —OCOR (R is alkyl group), —$NH_2$, —NCO and —SH.

5. The rubber composition of claim 4, wherein the hydrophilic resin is ethylene-vinyl alcohol copolymer, vinyl alcohol homopolymer, or poly(meth)acrylic acid.

6. The rubber composition of claim 1, wherein the resin having an affinity for the rubber component is a polyolefin based resin.

7. The rubber composition of claim 6, wherein the polyolefin based resin is polyethylene based resin, polypropylene based resin, polyolefin ionomer, or maleic anhydride-modified α-polyolefin.

8. The rubber composition of claim 1, wherein content of the composite fiber (B) is in the range of 0.1 to 100 parts by mass with respect to 100 parts by mass of the rubber component (A).

9. The rubber composition of claim 1, wherein the composite fiber (B) is obtainable by co-extrusion of the hydrophilic resin (a), the resin (b) having an affinity for the rubber component, and the resin (c) having affinities for both the hydrophilic resin and the resin having an affinity for the rubber component in a separate and mutually independent manner.

10. The rubber composition of claim 1, wherein the composite fiber (B) is obtainable by co-extrusion of: a mixture of the hydrophilic resin (a) and the resin (c) having affinities for both the hydrophilic resin and the resin having an affinity for the rubber component; and the resin (b) having an affinity for the rubber component in a separate and mutually independent manner.

11. The rubber composition of claim 1, wherein the composite fiber (B) is obtainable by co-extrusion of: the hydrophilic resin (a); and a mixture of the resin (b) having an affinity for the rubber component and the resin (c) having affinities for both the hydrophilic resin and the resin having an affinity for the rubber component in a separate and mutually independent manner.

12. A tire, using the rubber composition of claim 1 in a tread portion thereof.

* * * * *